United States Patent Office 2,982,665
Patented May 2, 1961

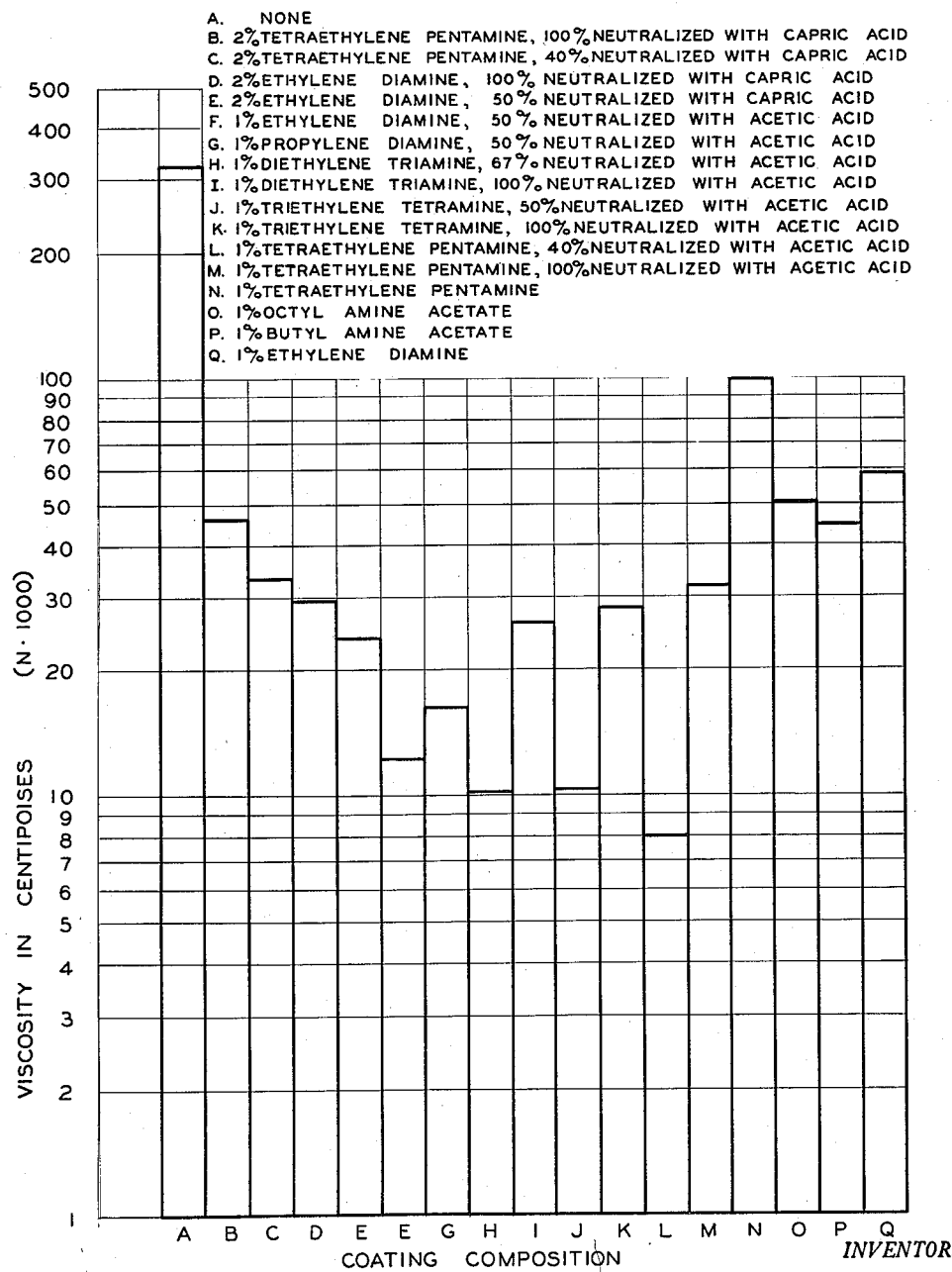

2,982,665
MODIFIED KAOLIN CLAY

James R. Wilcox, Westfield, N.J., assignor to Minerals & Chemicals Philipp Corporation, a corporation of Maryland Filed Aug. 16, 1957, Ser. No. 678,628
14 Claims. (Cl. 106—308)

This invention relates to a novel, modified, particulate, siliceous mineral useful as a filler or extender pigment and to a process for making the same. More specifically, the invention relates to kaolin clay modified as to its surface characteristics by a novel class of polar cationic compounds whereby the modified kaolin is readily wet by and dispersed in a variety of liquid organic vehicles to produce non-gelling suspensions therein of relatively low viscosity, as distinguished from clays modified to produce gels in organic liquids.

There is a need in many industries, particularly those formulating plastics, paints and inks, and coatings, to provide low viscosity organic systems including a particulate mineral filler or extender pigment therein, frequently in major proportions. In many instances, as in the preparation of moldable resin compositions and certain ink compositions, it is highly desirable that the filler systems have a sufficiently low viscosity to be processed efficiently.

Accordingly, it is a principal object of my invention to provide a mineral filler or pigment modified as to its surface characteristics to provide a product capable of being readily wet by and dispersed in large quantities in a variety of organic vehicle to produce a relatively low viscosity system without gelling in the vehicle. Another object is to teach methods of making the modified mineral.

Further objects will appear in further description of various embodiments of the invention. It will be understood that this invention is susceptible of various embodiments, within the scope of the appended claims, without departing from the spirit of the invention.

Briefly stated, and in accordance with the illustrative embodiments of this invention, a particulate, siliceous mineral is modified as to its surface characteristics by a novel class of organic cationic coating materials to produce a modified material capable of imparting unique flow properties to a variety of organic vehicles when incorporated therein. Kaolin is the preferred starting material because of the ease with which the cationic coatings may be applied and bonded to this material, because of the striking stability of the non-gelling suspensions of the modified kaolin in a variety of polar and non-polar organic liquid mediums and because of excellent gloss and finish imparted to finished pigmented products when kaolin coated with the coatings of the invention is employed.

More specifically, the novel pigment filler of my invention comprises kaolin clay modified as to surface characteristics by attachment thereto of at least one highly polar organic cationic material selected from the group consisting of: an aliphatic alkylene polyamine, a partially neutralized aliphatic alkylene polyamine or a neutralized aliphatic alkylene polyamine, the alkylene radical thereof having at least 1 amino group per 4 carbon atoms, and preferably at least one amino group per 2 carbon atoms.

When kaolin is coated with an organic amine two types of surface adsorption occur, viz. (1) chemisorption of the amine at the hydrogen exchange position forming a hydrophobic partial-surface film stable to displacement by water, and (2) physical adsorption of the amine over the remaining portion of the external surface forming a film which is unstable in the presence of water vapor or liquid water. The term "attachment" as used herein refers to this multiple adsorption mechanism. The attachment is preferably accomplished by dry milling the clay and cationic modifier together. I have found the preferred milling technique to be passage through a hammer mill, although other dry milling or fluid energy milling procedures well known to those skilled in the art can be used within the scope of my invention. In preparing the modified clay of my invention, I prefer to use as a clay starting material the fraction of water-washed kaolin having an average particle size corresponding to an average equivalent spherical diameter of about 0.5 micron. However, I wish to have it clearly understood that the invention is not limited to any particular size fraction of kaolin.

I prefer to mill the kaolin with certain salts of the polyamines, rather than the polyamines themselves, to obtain the modified clay of my invention because the kaolin so treated results in products of superior performance. Salts formed by the neutralization or partial neutralization of the polyamines by acetic acid are particularly well suited to the working of the invention, although polyamines treated with other organic acids such as stearic, rosin, and capric acids may be used. A mineral acid is satisfactory for the purpose, particularly where thermal stability is a primary consideration. The polyamines within the purview of my invention are strongly basic and readily react with organic and mineral acids to form poly-acid salts. Complete neutralization may be effected by reacting each amino constituent of the polyamine molecule with an equi-molal quantity of acid; partial neutralization results from reacting the polyamine molecule with fewer mols of acid than is required to neutralize each amino constituent of the polyamine molecule.

It is preferable to refer to the degree of neutralization of the polyamine and to the agent of neutralization rather than to affix a name to salts formed by the addition of acids to polyamines principally because the locus of acid addition to the polyamine molecule cannot readily be ascertained. Furthermore, since alkylene polyamines, and particularly some alkylene polyamine salts under certain conditions, tend to form equilibrium complexes with compounds formed by dimerization and trimerization of the polyamines, the exact composition of the cationic coating material is possibly a complex material. For example, it is theoretically possible to completely neutralize one mol of tetraethylene pentamine with 5 mols of univalent acid to form the pent-acetate of tetraethylene pentamine. When, however, 2 parts of acid is added to one part of the same polyamine the material is 40 percent neutralized; the locus of the salt formation in the molecule cannot readily be described nor can it be sure that the product is not the mixture of unneutralized molecules and molecules containing more than two salt groups per polyamine molecule. It is unimportant for the purposes of the invention that the precise mechanism of acid addition be established.

The preferred amine salts for use in my invention, from the standpoint of performance and economy, are aliphatic alkylene polyamines at least partially neutralized with acid, the alkylene radical containing at least one amino group per 2 carbon atoms.

Suitable alkylene polyamines for the purpose of my invention include: ethylene diamine, propylene diamine, tetraethylene diamine, triethylene tetramine, octa methylene diamine and tetraethylene pentamine. The amine to carbon ratio in these compounds is as follows:

ethylene diamine, 1:1; propylene diamine, 1:1.5; tetraethylene pentamine 1:1.6; triethylene tetramine, 1:1.5; octa methylene diamine 1:4. Heterocyclic polyamines, such as hexamethylene tetramine and salts thereof are not suitable. Typical partially neutralized alkylene polyamines include: ethylene diamine 50 percent neutralized with acetic acid, tetraethylene pentamine 40 percent neutralized with acetic acid, diethylene triamine 66⅔ percent neutralized with acetic acid, tetraethylene pentamine 40 percent neutralized with capric acid, triethylene tetramine 50 percent neutralized with stearic acid. Such partially neutralized polyamines are readily formed from the polyamines by addition thereto of acid in amount sufficient to achieve the desired degree of neutralization according to conventional procedure. Usually partially and completely neutralized polyamines are wax-like solids at ordinary room temperatures and frequently contain small amounts of water which need not be removed for the purposes of the invention.

The kaolin is milled with the solid or semi-solid polyamine or polyamine salt by any dry milling procedure well known in the art, although I have found the preferred milling technique to be passage through a hammer mill. Where the cationic material is a liquid the filler may be coated by spraying the filler while agitating the filler to insure thorough mixing. I have found about 0.5 to 2.0 percent, based on the weight of the clay, to be the preferred quantity of organic cationic material for use in my invention. Higher or lower proportions of polyamines and their salts can be used, however, within the scope of the invention. For example, kaolins modified by as little as 0.1 percent, based on the clay weight, of ethylene diamine 50 percent neutralized with acetic acid and as much as 4 percent, same basis, ethylene diamine 50 percent neutralized with acetic acid have proven effective for purposes of my invention. It has been established that beyond about 1 percent addition of cationic coating, the hydrophilic character of the kaolin is not reduced; nevertheless, the dispersibility of the modified clay in organic media is desirably altered from some applications.

I am aware that clays of varying base-exchange capacities have been modified by reaction with a variety of mono- and polyamines containing more than 10 carbon atoms per amine cation to render these clays highly organophilic and adapted to form gels in organic vehicles and to swell in nitrobenzene. These organophilic clays are adapted to be incorporated in small quantities in organic vehicles as suspending agents for particulate pigments, extenders and the like which are incorporated in the vehicle. My coated kaolins, however, are of a substantially different character and conform to organic vehicles in a markedly different fashion. Substantially smaller quantities of cationic material are required to coat the particular filler within the scope of my invention. The cationic coating material is highly polar by virtue of the high amine to carbon ratio and hence the coated clays have properties which are not predictable by these prior art coated clays. The modified clays of my invention do not swell in nitrobenzene nor are they capable of forming gels in organic vehicles; rather they are adapted to be readily wet by a variety of polar and non-polar organic liquids in which they form suspensions having no gel characteristics whatsoever and are capable of being highly loaded in these organic vehicles. It will be shown that the distinctive properties displayed by kaolin surface modified by polyamines within the purview of my invention are most distinctly manifest when the clay is coated with the partially neutralized alkylene polyamine. Kaolin so coated exhibits dilatancy in a liquid unsaturated polyester resin mix, indicating that the modified clay is deflocculated in the polyester resin and hence is capable of being loaded to the theoretical maximum in the resin. The other coated kaolins within the scope of the invention, that is, the unneutralized and completely neutralized polyamines, exhibit slight thixotropy at low rates of shear in the same polyester resin. Clays coated by the prior art practices referred to will produce highly thixotropic gels therein and will not be capable of being highly loaded without producing excessive consistency and poor flow in the vehicle.

The term "loading" as used herein refers to the weight of a filler in a vehicle-filler mix, its value being expressed as a percentage of the total vehicle-filler weight. I have found that the novel modified filler material of my invention is capable of being loaded in such organic vehicles as synthetic resins, particularly styrene-modified unsaturated polyester resins and epoxide resins, oils of a drying or semi-drying character such as linseed oil, bodied oils such as lithographic varnish, natural resins such as rosin, plasticizers including dibutyl phthalate, etc., mineral spirits, petroleum fractions, natural rubbers, and synthetic rubbers such as GR-S, butyl, and, polychloroprene. In a styrene-modified unsaturated polyester vehicle, for example, loadings as high as 60 percent are feasible to produce plastic, workable systems when the filler is kaolin coated with an aliphatic alkylene polyamine containing at least one amino group per 2 carbon atoms or the completely neutralized polyamine of this class; when the filler is a partially neutralized polyamine plastic system having loadings as high as 75 percent are attained without producing stiff, non-flowable masses.

My copending application, Serial No. 521,754, filed July 13, 1955, and now abandoned, is concerned with polyester resin mixes including as a novel filler kaolin coated with a small amount of a mono-amine or preferably mono-amine salts, containing no more than 8 carbon atoms in the longest chain by the same methods herein disclosed. However, none of the coated clays prepared by the practice of that invention possess to the same degree the combination of characteristics of the products of the instant invention nor do they predict the critically different physical properties displayed by the products herein disclosed, as will be shown hereafter.

Oil absorption studies indicate that the oil absorption capacity of kaolin coated with organic cationic material is inversely proportional to the hydrophobicity of the modified clay material. A "hydrophilic" solid is herein defined as one which is completely wet by water at room temperature; a "hydrophobic" or "organophilic" solid is one which is not wet by water, and forms a finite contact angle of about 75° with a water droplet on its surface. To measure oil absorption, 3 grams of the clay sample is placed on a smooth glass surface. A quantity of Regular Varnish #00 (a slightly bodied linseed oil varnish) is added dropwise from a microburet and the oil is worked into the clay with a hard spatula until the entire sample is wetted by the oil and clings together, in a solid mass. The oil absorption number is expressed as the volume of oil in milliliters necessary to wet 100 grams of clay and this quantity is converted to pounds of oil per 100 pounds of clay. Kaolin coated by the practices of this invention have absorption values of approximately 40 to 44 pounds of oil per 100 pounds of clay, a value close to the oil absorption value of the uncoated kaolin clay. The clay coated with mono-amines of comparable carbon chain length have considerably lower oil absorption values, from about 35 to 37 pounds of oil per 100 pounds of clay; this lower oil absorption value is concomitant to differing conformity to organic vehicles. Significantly, the clay coated with the fatty diamines, which have a very low amine to carbon ratio, have low oil absorption values, approximating the values shown by the mono-amine coatings above noted and their rheological properties in organic vehicles are somewhat similar; more specifically, they exhibit very marked thixotropy and cannot be as highly loaded in organic vehicles without producing high viscosity. The clay coated with 2% of a 12 carbon mono-amine acetate has an oil absorption value of only 29.8. It will be shown that kaolin coated with a heterocyclic polyamine, hexamethylene tetramine, or salts thereof, which has an amine to carbon ratio identical to that of triethylene tetramine or its salts, exhibits properties in organic vehicles different from that of the polyamine coated clays within the scope of this invention. Significantly hexamethylene tetramine (or salts thereof) coated kaolin has an oil absorption value of about 48. Some oil absorption values are tabulated below:

| Clay | Coating | Oil Absorption #Oil/100# clay |
|---|---|---|
| Kaolin (0.5 micron). | None | 43.2 |
| Do | 2% Ethylene Diamine, 50% neutralized with capric acid. | 40.7 |
| Do | 2% Ethylene Diamine, 100% neutralized with capric acid. | 42.2 |
| Do | 1% Tetraethylene Pentamine, 100% neutralized with acetic acid. | 44.7 |
| Do | 1% Tetraethylene Pentamine. | 42.6 |
| Do | 1% Tetraethylene Pentamine, 50% neutralized with acetic acid. | 42.9 |
| Do | 1% Mono Butyl Amine Acetate. | 36.3 |
| Do | 1% Octyl Amine Acetate. | 37.0 |
| Do | 2% Fatty-Diamine (19-21 carbon atoms). | 35.7 |
| Do | 2% Fatty-Diamine (19-21 carbon atoms), 50% neutralized with acetic acid. | 36.0 |
| Do | 2% Fatty-Diamine (19-21 carbon atoms), 100% neutralized with acetic acid. | 38.5 |
| Do | 2% 12 carbon mono-amine-acetate. | 29.8 |
| Do | 2% Hexamethylene Tetramine. | 47.2 |
| Do | 2% Hexamethylene Tetramine, 50% neutralized with acetic acid. | 48.5 |
| Do | 2% Hexamethylene Tetramine, 100% neutralized with acetic acid. | 47.8 |

Kaoline coated by the practice of this invention have residual hydrophilicity and will not swell in organic vehicles; however the modified clay also has sufficient organophilicity to be readily wet by a variety of organic vehicles and be highly loaded therein to form nongelling suspensions having relatively low settling rates. Furthermore, such modified clays are capable of being dispersed in aqueous and mixed-organic aqueous media.

Following are examples which are included only for purposes of contributing to a better understanding of the present invention and which are not to be interpreted as limiting the invention to the embodiments set forth therein.

Samples of water-washed kaolin clay, 2500 grams each, were weighed from water fractioned clay stock of an average equivalent spherical diameter of 0.5 micron and containing not more than 1 percent of moisture. Into each of these clay samples 1 percent by weight of the following materials was added and the mixture milled in a hammer mill.

Ethylene diamine
Ethylene diamine, 50% neutralized with acetic acid
Propylene diamine
Propylene diamine, 50% neutralized with acetic acid
Diethylene triamine
Diethylene triamine, 66⅔% neutralized with acetic acid
Diethylene triamine, 100% neutralized with acetic acid
Triethylene tetramine, 50% neutralized with acetic acid
Triethylene tetramine, 100% neutralized with acetic acid
Tetraethylene pentamine
Tetraethylene pentamine, 50% neutralized with acetic acid
Tetraethylene pentamine, 100% neutralized with acetic acid
Tetraethylene pentamine, 40% neutralized with caproic acid
Tetraethylene pentamine, 100% neutralized with caproic acid

EXAMPLE I

This example illustrates the substantial differences in viscosity between: a resin-filler mix made with unmodified kaolin, resin filler mixes made by coating kaolin with mono-amine salts, and resin filler mixes made with the modified kaolin of my invention. It also clearly demonstrates that partially neutralized alkylene polyamines are superior to mono-amines, unneutralized alkylene polyamines and completely neutralized alkylene polyamines in keeping resin-filler mix viscosities to a minimum. Several samples of modified clay produced in Example I were mixed into separate batches of the liquid polyester resin Laminac 4128 at a weight ratio of 40 parts of modified clay to 60 parts of resin. Laminac is a general purpose, unsaturated, styrene-modified polyester resin produced and sold by American Cyanamid Company. It is made by esterifying a mixture of maleic and phthalic acids with a 10% excess of saturated polyalcohol and blending in styrene. Viscosities of the resin filler mixes at 77° F. were determined using a Brookfield viscosimeter at a speed of 10 r.p.m. In addition, the viscosity of a resin-filler mix similar in every respect to those mentioned, except containing unmodified kaolin was determined in the same fashion. Likewise samples of the kaolin modified with 1 percent by weight of several mono-amine salts, octyl amine acetate and butyl amine acetate, were measured. The experimental results shown in the figure correlate viscosity, in centipoises (shown on a logarithmic scale) with filler composition. This figure definitely shows a substantial drop in apparent viscosity from the unmodified kaolin mix to any mix incorporating the coatings herein disclosed. For example, the unmodified kaolin mix had an apparent viscosity about 320,000 centipoises whereas kaolins coated according to the teachings of my invention range in viscosity from 10,000 to about 100,000 centipoises, and from about 10,000 to about 30,000 centipoises where the polyamine salt is an acetate. Although kaolin coated with butyl amine acetate or octyl amine acetate is effective for the purpose set forth, the figure demonstrates that the aliphatic polyamine salt corresponding to a like number of carbon atoms is markedly superior in reducing the apparent viscosity of a resin-filler mix incorporating it as a coating agent.

The figure shows the very decided viscosity reduction achieved when the coating composition comprises a partially neutralized alkylene polyamine. It will be noted that kaolin coated with 1 percent of diethylene triamine ⅔ neutralized with acetic acid reduced the apparent viscosity to about 1/32 of the apparent viscosity of polyester load with unmodified kaolin.

I have further discovered that there is a correlation between viscosity of the coated pigments in styrene-modified polyester resins and ease of wetout, ability to stay in suspension, and viscosity in a wide range of polar and non-polar organic vehicles.

Among the properties of pigments that influence settling rates in liquid media are specific gravity, particle size and shape, concentration of pigment in suspension, state of flocculation and wetability in the liquid.

EXAMPLE II

This example illustrates the effect of surface coating on filler settling rates in kerosene, mineral spirits, toluene and monomeric styrene.

Twenty-four gram samples of the surface modified kaolin prepared as in Example I were ground for one hour in a ball mill with 300 ml. of vehicle. After grinding, 200 ml. of the resultant slurry was placed in a 250 ml. glass stoppered graduate, the graduate then slowly upended six times and immediately set upright on a stationary surface. At the end of one hour of settling the number of ml. of clear supernatant liquid in the graduate was determined visually and recorded as an indication of the settling rates of fillers tested. The results tabulated below show that surface coated fillers of the invention exhibit substantially lower settling rates than their uncoated counterparts or fillers coated with mono-amines as taught in my copending U.S. application, Serial No. 521,754, filed July 13, 1955, and now abandoned. Significantly, those with the lowest settling rates also exhibited lowest viscosity in polyester suspensions.

In testing for settling rates, pigment concentration was kept at a low level in order to encourage rapid settling.

EXAMPLE III

This example illustrates the importance of maintaining a relatively high amine to carbon ratio in the cationic material used as a coating for kaolin to provide a filler capable of being highly loaded in an unsaturated polyester. Kaolin (0.5 micron average particle size) was pre-mixed with 2 percent by weight of a fatty diamine having an amine to carbon ratio of .01 to 1 and the mixture micronized by steam in a fluid energy mill at 600° F. at 75 p.s.i.g. The fatty diamine has the following general formula:

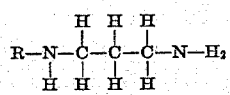

The "R" group consists of straight chain hydrocarbon radicals derived from tallow fatty acids which are 16 and 18 carbon atoms in length, both saturated and unsaturated chains being present.

VISCOSITY OF COATED CLAYS AT 40 PERCENT LOADING IN LAMINAC 4128

| Coating | 10 r.p.m. | 20 r.p.m. | 50 r.p.m. | 100 r.p.m. |
|---|---|---|---|---|
| 2% Fatty Diamine | 78,000 | 38,000 | 18,000 | (¹) |
| 2% Fatty Diamine, 50% neutralized with acetic acid | 132,000 | 76,000 | 36,000 | 26,000 |
| 2% Fatty Diamine, 100% neutralized with acetic acid | 140,000 | 80,000 | 40,000 | 22,800 |

¹ Extremely thixotropic.

It is evident that the diamines which have a low amine to carbon ratio are unsatisfactory fillers for the purpose above set forth.

EXAMPLE IV

The rheology of an unsaturated polyester mix including as a filler kaolin coated with a heterocyclic polyamine, hexamethylene tetramine, having an amine to carbon ratio of .66 to 1 was investigated and from the results, tabulated below, it is evident that the heterocyclic character of the coating exerts an adverse effect on the filler properties of the clay. To further illustrate the effect, the viscosity characteristics of triethylene tetramine, an aliphatic polyamine having an amine to carbon ratio of 0.66 to 1 are included.

VISCOSITY OF KAOLIN AT 40% LOADING IN LAMINAC 4128

| | 10 r.p.m. | 20 r.p.m. |
|---|---|---|
| 2% Hexamethylene Tetramine | 304,000 | (¹) |
| 2% Hexamethylene Tetramine, 50% neutralized with acetic acid | 264,000 | 184,000 |
| 2% Hexamethylene Tetramine, 100% neutralized with acetic acid | 260,000 | 174,000 |
| 1% Triethylene Tetramine, 50% neutralized with acetic acid | 10,500 | 22,250 |
| 1% Triethylene Tetramine, 100% neutralized with acetic acid | 28,000 | (¹) |

¹ Off scale.

The ability of kaolin coated by the practices taught herein to be readily wet by organic vehicles and to be highly loaded in organic vehicles without producing excessive consistency make such a modified material both an excellent mineral filler for liquid resins and rubber mixes and a desirable extender pigment for coating compositions.

Furthermore, I have discovered that gloss of pigmented systems, including paints, inks, plastics has been improved where surface coated pigments were substituted for their uncoated counterparts. This is partially attributable to more complete wetout of pigments by the organic vehicle due to the coating.

The novel modified filler of my invention is useful as an anti-caking agent in dry fertilizer compositions, particularly when the filler is coated with fatty acid salts of any of the polyamines within the purview of my invention.

I claim:

1. Kaolin clay the particles of which are coated with from 0.1 to 4.0 percent by weight of at least one material selected from the group consisting of an aliphatic alkylene polyamine containing at least 1 amine group per 4 carbon atoms and salts of said polyamine.

2. The composition of claim 1 in which said alkylene polyamine is ethylene diamine.

3. The composition of claim 1 in which said alkylene polyamine is diethylene triamine.

4. The composition of claim 1 in which said alkylene polyamine is propylene diamine.

5. The composition of claim 1 in which said alkylene polyamine is triethylene tetramine.

6. Kaolin clay the particles of which are coated with from 0.1 to 4.0 percent by weight of a monoacid salt of ethylene diamine.

7. Kaolin clay the particles of which are coated with from 0.1 to 4.0 percent by weight of ethylene diamine monoacetate.

Table I

SETTLING RATES OF COATED AND UNCOATED FILLERS—ML. OF CLEAR SUPERNATANT LIQUID AFTER ONE HOUR OF SETTLING

| Pigment | Coating | Kerosene | Styrene | Toluene | Mineral Spirits |
|---|---|---|---|---|---|
| Kaolin (Av. Equivalent Spherical Diameter 0.5 micron). | None | 14 | 18 | 24 | 15 |
| Do | 1% Ethylene Diamine, 50% neutralized with Acetic Acid. | 5 | 6 | 12 | 5 |
| Do | 1% Octyl amine Acetate | 16 | 41 | 35 | 26 |
| Do | None | 62 | 70 | 72 | 60 |
| Do | 1% Ethylene Diamine, 50% neutralized with Acetic Acid. | 27 | 28 | 30 | 27 |

8. Kaolin clay the particles of which are coated with from 0.1 to 4.0 percent by weight of a diacid salt of diethylene triamine.

9. Kaolin clay the particles of which are coated with from 0.1 to 4.0 percent by weight of diethylene triamine diacetate.

10. Kaolin clay the particles of which are coated with from 0.1 to 4.0 percent by weight of a diacid salt of triethylene tetramine.

11. Kaolin clay the particles of which are coated with from 0.1 to 4.0 percent by weight of triethylene tetramine diacetate.

12. Kaolin clay the particles of which are coated with from 0.1 to 4.0 percent by weight of a diacid salt of tetraethylene pentamine.

13. Kaolin clay the particles of which are coated with from 0.1 to 4.0 percent by weight of a monoacid salt of propylene diamine.

14. Kaolin clay the particles of which are uniformly coated with from 0.1 to 4.0 percent by weight of propylene diamine monoacetate.

References Cited in the file of this patent

UNITED STATES PATENTS

| | | |
|---|---|---|
| 2,320,009 | Ralston et al. | May 25, 1943 |
| 2,341,994 | Kingsbury | Feb. 15, 1944 |
| 2,622,987 | Ratcliffe | Dec. 23, 1952 |
| 2,697,699 | Cohn | Dec. 21, 1954 |
| 2,852,406 | Riegler et al. | Sept. 16, 1958 |
| 2,867,540 | Harris | Jan. 6, 1959 |
| 2,885,360 | Haden et al. | May 5, 1959 |

OTHER REFERENCES

Bearn: "Chemistry of Paints, Pigments, and Varnishes," van Nostrand, N.Y., page 34, 1924.

UNITED STATES PATENT OFFICE
CERTIFICATION OF CORRECTION

Patent No. 2,982,665                          May 2, 1961

James R. Wilcox

It is hereby certified that error appears in the above numbered patent requiring correction and that the said Letters Patent should read as corrected below.

Column 3, line 41, for "from" read -- for --; column 5, line 36, for "Kaoline" read -- Kaolin --; column 7, Table I, under the column headed "Pigment" the last two items labelled "Do" should read as shown below:

Kaolin
(Av. Equivalent Spherical
Diameter 1.5 micron)

Kaolin
(Av. Equivalent Spherical
Diameter 1.5 micron)

Signed and sealed this 12th day of June 1962.

(SEAL)
Attest:

ERNEST W. SWIDER                                      DAVID L. LADD

Attesting Officer                                          Commissioner of Patents